(12) United States Patent
Lien

(10) Patent No.: US 11,970,640 B2
(45) Date of Patent: Apr. 30, 2024

(54) ADHESIVE, A PRODUCTION METHOD OF A WOOD BOARD USING THE ADHESIVE AND PRODUCT THEREOF

(71) Applicant: Chien-Fan Lien, Taichung (TW)

(72) Inventor: Chien-Fan Lien, Taichung (TW)

( * ) Notice: Subject to any disclaimer, the term of this patent is extended or adjusted under 35 U.S.C. 154(b) by 0 days.

(21) Appl. No.: 17/411,316

(22) Filed: Aug. 25, 2021

(65) Prior Publication Data

US 2022/0064506 A1    Mar. 3, 2022

(30) Foreign Application Priority Data

Aug. 28, 2020   (TW) .................... 109129654

(51) Int. Cl.
| | | |
|---|---|---|
| *C09J 189/00* | (2006.01) | |
| *B03C 1/02* | (2006.01) | |
| *B27N 1/02* | (2006.01) | |
| *B27N 3/00* | (2006.01) | |
| *B27N 3/02* | (2006.01) | |
| *B27N 3/08* | (2006.01) | |
| *C09J 103/02* | (2006.01) | |
| *C09J 103/06* | (2006.01) | |
| *C09J 103/10* | (2006.01) | |

(52) U.S. Cl.
CPC .............. *C09J 189/00* (2013.01); *B27N 1/02* (2013.01); *B27N 3/002* (2013.01); *B27N 3/007* (2013.01); *B27N 3/02* (2013.01); *B27N 3/08* (2013.01); *C09J 103/02* (2013.01); *C09J 103/06* (2013.01); *C09J 103/10* (2013.01); *B03C 1/02* (2013.01)

(58) Field of Classification Search
CPC ...... C09J 189/00; C09J 103/02; C09J 103/06; C09J 103/10; B27N 1/02; B27N 3/002; B27N 3/007; B27N 3/02; B27N 3/08; B27N 1/00; B27N 3/04; B27N 1/0209; B27N 3/10; B27N 3/18; B27N 3/203; B03C 1/02; B27L 11/02

USPC ..................................... 106/162.51
See application file for complete search history.

(56) References Cited

U.S. PATENT DOCUMENTS 9,493,693 B2 * 11/2016 Li ........................... C08L 97/02

FOREIGN PATENT DOCUMENTS

| | | | | |
|---|---|---|---|---|
| CN | 108724419 A | * | 11/2018 | |
| WO | WO-2015141879 A1 | * | 9/2015 | ............ B31F 1/2809 |

OTHER PUBLICATIONS

Machine translation of WO 2015141879 A1 originally published Sep. 2015 to Seon (Year: 2015).*
CN-108724419-A, English translation (Year: 2018).*

* cited by examiner

*Primary Examiner* — Sheng H Davis
*Assistant Examiner* — Ritu S Shirali
(74) *Attorney, Agent, or Firm* — Best & Flanagan LLP

(57) ABSTRACT

An adhesive includes an organic material, an inorganic material, a curing agent and a catalyst. The adhesive is able to bond the wood material, especially recycled wood material. The wood material is not necessary to have any pretreatment like removing color, pigment or plastic lining so as to be introduced to the film process directly. After breaking and adjusting the moisture content of the wood material, it can be mixed with the adhesive and hard pressed into wood product with good duration and quality. The adhesive and the production method of wood board is able to ameliorate the problem of the conventional water based adhesive to save energy and processing time.

15 Claims, 3 Drawing Sheets

ADHESIVE, A PRODUCTION METHOD OF A WOOD BOARD USING THE ADHESIVE AND PRODUCT THEREOF

FIELD OF INVENTION

The present invention is related to an adhesive and its application to a production method of a wood board, especially to an adhesive containing starch or a starch-based adhesive, and such adhesive is mixed with wood chips or wood fiber particles for making the word board.

The present invention is more referred to an environmentally friendly wood boards or similar block materials made by mixing recycled wood chips or wood fiber particles with the said adhesive and its production method of the same.

BACKGROUND OF THE INVENTION

Wood as primary materials are widely used in various industries or fields such as building materials, decorative materials, template materials, treads or temporary road paving used in building construction. As these industries grow continuously bringing about rapid economic growth, there is an increasing demand for large amounts of wood materials that in turn causes large levels of deforestation and exploitations of wood resources that leaves an irreversible impact on the sustainability of the environment. The wood material is also only controlled by countries with large areas of forest resources, and it is difficult for countries without natural resources of trees to develop related economic industries. Also, the idea of overly using the wood materials is also against current environmental protection awareness.

The resource of wood materials is not just the single problem for such industries. The issue of waste from wood board products also creates the problem of environmental pollution. In order to pursue higher-quality products, more complex additives and manufacturing processes are used, which decreases the recyclability of the wood products at the end of their lifetime or deems them unrecyclable and destined for landfill or incineration. The majority of wood product wastes are destroyed by incineration which not only wastes all these precious natural resources, but also deepens the negative impact on the environment with air pollution.

Furthermore, for the production process of wood boards nowadays, especially flake boards (also commonly known as particleboards), water-based thermosetting adhesives are usually used for production by mixing with the wood fibers or particles. Before mixing the wood fibers or particles with the water-based adhesives, the wood particles must undergo a dehydration drying process to decrease the overall moisture content to below 3%, which is both highly time and energy consuming. These wood boards also have a very limited value to be recycled not only because they have already been bonded by a glue but mostly due to the presence of a glued layer of plastic or melamine laminates on the surface of wood boards that makes it difficult to separate and recycle. In current wood board manufacturing processes, wood board products cannot be 100% recycled to make new boards, only a maximum of only 30% of recycled boards can be reintroduced into a new round of production for producing new wood boards.

Hence, there is eager to have a better solution that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to solve the aforementioned problems, the first concept of the present invention is an adhesive composition in powder form comprises an organic material including protein and/or starch in a range of 30%-80% w/w; an inorganic material in a range of 10%-40% w/w, the inorganic material comprising a mixture of group IA metal oxides and carbonates or a mixture of group HA metal oxides, hydroxides and carbonates; a curing agent contains one or multiple types of boron compounds in a range of 5%-30% w/w; and a catalyst at a range of 0%-3% w/w.

In accordance, the protein in the organic material comprises soybean proteins; and the starch in the organic material comprises modified or natural starch.

The present invention further provides another concept of a production method for aforementioned adhesive composition comprises steps of: crushing a wood raw material and removing impurities to obtain wood raw material particles; mixing an adhesive composition as claimed in claim 1 in powder form with the wood raw material particles to obtain a wood mixture; measuring a moisture content of the wood mixture until the moisture content is less than 17% w/w; and spreading the wood mixture flat on a surface then hot pressed into a wood board, a wood sheet or a wood block.

In accordance, the wood raw material comprises fresh/virgin wood or recycled wood; and the wood raw material further comprises straw stalk, rice bran, bamboo or palm.

In accordance, a magnetic separation process is applied in the crushing process steps.

In accordance, measuring the moisture content of the wood mixture until the moisture content to be less than 15% w/w or at a range of 12-15% w/w.

In accordance, the wooden board, sheet or block can be polished and/or cut according to product requirements.

In accordance, the present invention has the following advantages:

1. The adhesive composition provided by the present invention can directly introduced to the production of wood board using wood materials, especially to recycled wood raw materials. Any pre-treatment for removing plastic or appearance layer or additives are not necessary for the present invention in the recycled wood raw materials and it can be directly applied to the production process. The recycled wood raw materials will be mixed with the adhesive composition of the present invention after finely crushed and suitable moisture adjustment. Follow by hot-pressing such wood mixture into board, panel or sheet form, the present invention could provide the wood board products with high strength and good quality. The present invention can achieve the goal of remaking the recycled wood material in to a new products and fulfill the purpose of saving the natural plants resource achieving the effect of sustainable development. The present invention can also benefit those countries without forestry resource to be able to have their wood board business with competent products in a reasonable production cost.

2. The production method provided by the present invention can improve the problems of the conventional water-based adhesive. After obtaining wood fibers or particles from wood raw material from the crushing process, the wood raw material particles of the present invention does not require additional drying processing. In the production process, the wood raw material can be directly mixed with the powdery adhesive composition under room temperature and pressure to achieve a suitable moisture content during the hot-pressing process which could consider as a production method saving energy and processing time and also obtaining excellent final products. Many of the attendant features and advantages of the present invention will become better understood with reference to the following detailed description considered in connection with the accompanying figures and drawings.

DETAILED DESCRIPTION OF THE PREFERRED EMBODIMENTS

Figure 1:
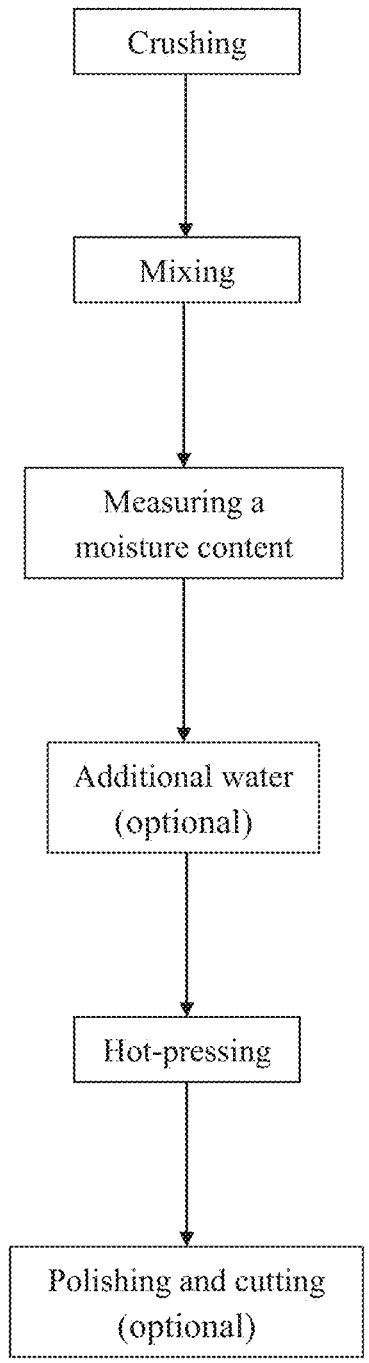
FIG. 1 is a flowchart of a first preferred embodiment of production method of making the wood board in accordance with the present invention.

Reference will now be made in detail to the present preferred embodiments of the invention, examples of which are illustrated in the accompanying drawings.

First Preferred Embodiment of an Adhesive Composition

The present invention firstly provides a first preferred embodiment of an adhesive composition. In this embodiment, the adhesive composition comprises:
  an organic material in a range of 30%-80% w/w referring to the weight percent based on a total weight of the adhesive composition;
  an inorganic material in a range of 10%-40% w/w referring to the weight percent based on a total weight of the adhesive composition;
  a curing agent in a range 5%-30% w/w referring to the weight percent based on a total weight of the adhesive composition; and
  optionally, a catalyst below 3% w/w referring to the weight percent based on a total weight of the adhesive composition.

In this embodiment, the aforementioned organic material is the main component of the adhesive composition, including protein and/or starch. The protein may be Soybean proteins, and the starch includes but is not limited to modified or unmodified (natural) starch or a mixture of the modified and unmodified starches, such as corn starch, tapioca starch (Tapioca starch), oxidized starch (Oxidized starch) or esterified starch (Esterified starch). The existence of the organic materials enables the present invention to present stronger adhesion ability. When the organic material is exposed to moisture and heat, the organic material will possess a fluid nature. As such, the adhesive is able to reach or even permeate gaps of treated wood flakes, fibers or powders and create adhesive or bonding for treated wood flakes, fibers or powders to be formable into shaped products. However, if the content of the organic material is too little, the adhesive composition will not easy to be diffused within the wood flakes, fibers or powders and affect the adhesion efficiency. On the other hand, if the content of the organic material is too much, the organic material cannot effectively interact with other components in the adhesive, such as the inorganic material and the hardened adhesive to achieve the optimized cross-linking reaction with the curing agent and the catalyst. The adhesion efficiency of adhesive composition will then reduce.

The aforementioned inorganic material preferably contains two different compositions, the first one is a first mixture containing group IA metal oxides and carbonates, and the second one is a second mixture containing group IIA metal oxides, hydroxides and carbonates. More preferably, the content of the second mixture has greater amount than the first mixture in the inorganic material. The existence of the inorganic materials enables the adhesive composition presented in a weak alkaline condition. The adhesive composition can be gelatinized to reduce viscosity, so that the fluidity and ductility of the adhesive composition can be controlled along with the physical strength/properties of the adhesive composition can also be increased. When the amount of the inorganic material in the adhesive composition is too little, the gelatinization effect cannot be effectively achieved, which could easily lead to poor fluidity and ductility of the adhesive composition. However, when the amount of the inorganic material is too much, not only the cost will increase, but the final structure is also prone to decrease in physical strength due to excessive looseness within the adhesion interface.

The curing agent contains one or multiple types of boron compounds. The boron compound provides a better complexing effect and bonding strength and also works as a preservative in the adhesive composition for extending the lifetime of the adhesive composition. The catalyst in the present invention contains a group IA metal hydroxide. The catalyst can help the gelatinization ability of the adhesive composition under weak alkaline conditions, and promote the adhesive composition to produce sufficient fluidity and ductility. The combination of the curing agent and the catalyst enables the adhesive composition provided by the present invention to have various physical and chemical characteristics according to requirements.

Embodiment 1 for Producing a Wood Board Using the Adhesive Composition as Mentioned Above The aforementioned adhesive composition of the present invention is particularly suitable for the production of wood boards, including Particle Boards or Medium Density Fiberboard (MDF) or other wood (wood fiber) boards, sheets or blocks applied in the market. The wood board suitable for the present invention is basically a board, sheet or block formed by mixing the crushed wood raw material, perfectly in a form of particles, powder or wood fiber with the adhesive composition provided by the present invention. It can be a single-layer or multi-layer board. The wood fiber may also include straw stalk, rice bran, bamboo, palm or other natural fibers.

With reference to FIG. 1, the steps of the production method for producing wood board using the adhesive composition include:
  S1) crushing a wood raw material and removing impurities (optional) to obtain wood raw material particles;
  S2) mixing the aforementioned adhesive composition in powder with the wood raw material particles to obtain a wood mixture;
  S3) measuring a moisture content of the wood mixture until the moisture content is less than 17% w/w (percentage concentration by mass), or preferably less than 15% w/w, or more preferably between 12-15% w/w;

S4) (Optional) if the moisture content in the aforementioned step 3 is less than 12% w/w, additional water can be added to increase the moisture content;

S5) spreading the wood mixture flat on a surface then hot-pressing into a wood board, a wood sheet or a wood block.

S6) (Optional) polishing and cutting the wooden board, the wood sheet or the wood block according to product requirements.

The adhesive composition in the present invention acts as a bonding material between the crushed wood raw material powder, particles or fibers. The high adhesive and bonding force could make the glued wood raw material powder not easy to break into pieces. The finished products as described above (the wood board, sheet or block) can be directly recycled into the production process provided by the present invention and making new wood products in high quality. The adhesive composition is no need to be removed from the recycled products. Preferably, a mixing ratio of the wood raw material and the adhesive composition is at a range of 1:0.1 to 1:0.25. The wood board, sheet or block containing the adhesive composition in the first preferred embodiment is preferred to be fresh or virgin wood raw material with wood texture, fiber or pores that are clean without impurities. The adhesive composition hence can be evenly dispersed within the wood fibers or pores achieving the best bonding result.

Further, controlling the moisture content of the adhesive composition of the present invention is also a critical point in the production process. The moisture content directly reflects the result of the subsequent hot-pressing step and the quality of the product. Normally, the moisture content of the wood raw material before processing is about 10~11% w/w depend on the sources, which is not suitable for the production. Therefore, the conventional production requires additional heating and drying steps before adding the water-based adhesive to ensure that the wood mixture after adding the water-based adhesive (or glue) presents a suitable moisture content around 9-12% w/w. However, the adhesive composition provided by the present invention is mixed with the wood raw material powder, particles or fibers in a powdered form with constitute of protein and starch, which already containing water or moisture around 8~9.5% w/w to be directly mixed with the crushed wood raw material. The wood raw material using in the present invention does not require additional heating and drying processes, which can save the cost of energy and time. At the same time, the present invention uses an A&D MX-50 moisture analyzer to ensure that the moisture content of the mixture meets the requirement.

Embodiment 2 for Producing a Wood Board Using the Adhesive Composition

In the second preferred embodiment of the present invention of using the adhesive composition to make wood boards, the steps are essentially the same as provided by the previous first embodiment. The major difference is that the wood raw materials in the second embodiment can include recycled wood products purely or mixed with the virgin wood raw material. From the recycled wood products as raw material, they usually contain various additives such as plastic materials, pigments, surface laminates, functional additives, or metal accessories with the content between 10% and 20% in the wood raw material.

Further, for the non-wood raw materials that contain the metal accessories, a magnetic separation process can be used in the crushing process steps to ensure that the metal accessories are fully removed from the proceed raw material. Further, adding the adhesive composition in powder form as mentioned above makes the non-wood constituents in the wood mixture approximately 30% to 60% w/w referring to the weight percent based on a total weight of the wood board. The adhesive composition provided by the present invention enables such that 100% recycled wood products can be used as the sole source of wood raw material and that impurities (excluding metal) like plastic materials, colorants, surface laminates, functional additives and other materials need not be removed. The recycled wood products can be directly introduced into the production process of the present invention. The adhesive composition can glue or bonding the powder, particles or fibers in the mixture and shaped into wood product, like film, panel, sheet or block with excellent strength and physical properties.

The aforementioned recycled wood products can be but not limited to, for example, recycled flake board with various additives like thermosetting water-based adhesive or glue or laminated plastic layer (for appearance). Preferably, a mixing ratio of the recycled wood material and the adhesive composition of the present invention is at a range of 1:0.13-1:0.25. As the pores of the wood fiber of recycled wood products have already been filled with all the additives in the previous manufacturing process, it is necessary to increase the content of the adhesive composition provided by the present invention to achieve the best bonding and adhesive results. The adhesive composition provided by the present invention could allow the recycled wood products to be successfully re-applied to the production process without additional removal steps for the impurities achieving the goals that wooden products can be recycled and reused in producing high quality recycled products.

With reference to below charts 1 to 3, in order to obtain the best ratio of the adhesive composition, the present invention provides several different formulas of the adhesive composition to make corresponded wood board samples according to above production method. Further the wood board samples are tested by CNS2215-2017 and CNS2215-2017 respectively for testing bending strength and screw retention condition. For the bending strength test, an average deformation speed is 10 mm/min (mm/min) for testing the wood board sample with the specification 320 mm in length (Mm), 50 mm width and 18 mm thickness. According to standard requirement, the bending strength of the wood board samples should be greater than 8 N/mm$^2$ For the screw retention test, a tensile load speed is 2 millimeters per minute (mm/min). According to standard requirement, the screw retention force of the wood board needs to be greater than 300N.

More preferably, the wood board samples of the present invention also conduct a flame resistance test using a butane gas torch to burn for 2 minutes at a flame temperature of 1200 degrees Celsius in a distance of 5 cm from the sample. After the butane gas torch is removed from the wood board samples, if the flame on the wood board is extinguished within 2 seconds, the wood board can be determined as passing the flame resistance test which all the wood board samples of the present invention are all passed the said test. However, the conventional flake boards in the market normally use additional cosmetic coatings, surface laminates or functional additives to achieve the flame resistance ability. There is no strict requirement that the flake board as a core layer needs to achieve flame resistance ability.

With reference to chart 1, several embodiments of the adhesive composition of the present invention are provided with different content of the organic material including 20% w/w (formula 1 and formula 2), 30% w/w (formula 3 and formula 4) and 50% (formula 5 and formula 6) for making the wood board samples for testing bending strength, the screw retaining force and the flame resistance abilities. It is observed that the wood board samples made from formula 1 and formula 2 cannot meet the expected bending strength and screw retention test. The wood board samples made from formula 5 and formula 6 perform good bending strength and screw retention abilities. The formula 3 although also contains 30% w/w of the organic materials, the content of the curing agent in formula 3 is more than the content of the curing agent of the formula 4. Therefore, it is understandable and reasonable to read that the formula 3 has higher content of the curing agent (also happened to formula 1 and formula 2) could result the poor adhesive condition affecting the bending strength and screw retention couldn't reach the standard as formula 4. As shown in chart 1, the present invention is preferred to have the organic material with the content above 30% w/w.

It is worth noting that the wood board samples made by formula 1 and formula 2 can perform excellent flame resistance ability which could make the wood board product directly applied to the market without special surface treatment to have a good flame resistance ability and maintain excellent bending strength and screw retention force.

CHART 1

| | Organic material (% w/w) | Inorganic material (% w/w) | Curing agent (% w/w) | Bending force (N/mm²) | Screw retention force (N) | Flame resistance |
|---|---|---|---|---|---|---|
| formula 1 | 20 | 30 | 50 | 1.94 | 143 | yes |
| formula 2 | 20 | 40 | 40 | 2.1 | 169 | yes |
| formula 3 | 30 | 30 | 40 | 7.56 | 239 | yes |
| formula 4 | 30 | 40 | 30 | 8.1 | 354 | yes |
| formula 5 | 50 | 30 | 20 | 8.6 | 630 | yes |
| formula 6 | 50 | 40 | 10 | 8.09 | 349 | yes |

With reference to below chart 2, the present invention compares several embodiments with different usage of the organic materials contents in the adhesive composition including 50% w/w (formula 1 and formula 2), 70% w/w (formula 3 to formula 5), 80% w/w (formula 6 to formula 8) and 85% w/w (formula 9 and formula 10), respectively for the bending strength, the screw retention force and the flameproof or flame resistance tests. The wood board samples from formula 1 to formula 7 exhibits good bending strength and the screw retention force. The wood board sample from formula 8 containing 80% w/w of the organic ingredient shows a bit weaker bending strength and the screw retention force with the absent of the curing agent and also resulting weaker adhesive ability.

In formula 6 and formula 7, the content of the organic material in the adhesive composition are both 80% w/w which is too much to reach the standard for the flame resistance test. However, these two embodiments still meet the requirements for bending strength and the screw retention force. According to the current regulation which is silenced to have any requirement of the flame resistance to such flake board, it can be conclusive that the organic materials is preferred to have the content in ratio between 30/ow/w to 80% w/w.

CHART 2

| | Organic material (% w/w) | Inorganic material (% w/w) | Curing agent (% w/w) | Bending force (N/mm²) | Screw retention force (N) | Flame resistance |
|---|---|---|---|---|---|---|
| formula 1 | 50 | 20 | 30 | 8.16 | 325 | yes |
| formula 2 | 50 | 25 | 25 | 8.39 | 511 | yes |
| formula 3 | 70 | 10 | 20 | 9.14 | 576 | yes |
| formula 4 | 70 | 15 | 15 | 9.19 | 612 | yes |
| formula 5 | 70 | 20 | 10 | 9.08 | 584 | yes |
| formula 6 | 80 | 10 | 10 | 8.14 | 330 | no |
| formula 7 | 80 | 15 | 5 | 8.06 | 367 | no |
| formula 8 | 80 | 20 | 0 | 4.7 | 129 | no |
| formula 9 | 85 | 10 | 5 | 5.21 | 249 | no |
| formula 10 | 85 | 15 | 0 | 3.77 | 168 | no |

With further reference to chart 3, the present invention compares several embodiments with different usage of the organic materials contents in the adhesive composition including 30% w/w (formula 1 to formula 3), 50% w/w (formula 4 to formula 8), 70% w/w (formula 9 to formula 10) and 80% w/w (formula 11 and formula 12), respectively for the bending strength, the screw retention force and the flame resistance tests. As shown in the results of formula 2, formula 3 and formula 8, when the content of the inorganic material is greater than 40% w/w, its bending strength is significantly reduced, especially the screw retention force of formula 2 and formula 3 is weaker. From the results of formula 9 and formula 11, the wood board sample from such formula with 5% w/w inorganic material, the bending strength meets the requirements. However, the screws retention force does not reach the standard. As the conclusion that the preferred content of the inorganic material can be in a ratio between 10% w/w and 40% w/w.

CHART 3

| | Organic material (% w/w) | Inorganic material (% w/w) | Curing agent (% w/w) | Bending force (N/mm²) | Screw retention force (N) | Flame resistance |
|---|---|---|---|---|---|---|
| formula 1 | 30 | 40 | 30 | 8.1 | 354 | yes |
| formula 2 | 30 | 45 | 25 | 5.6 | 287 | yes |
| formula 3 | 30 | 50 | 20 | 4.3 | 268 | yes |
| formula 4 | 50 | 15 | 35 | 8.07 | 280 | yes |
| formula 5 | 50 | 25 | 25 | 8.39 | 511 | yes |
| formula 6 | 50 | 35 | 15 | 8.51 | 537 | yes |
| formula 7 | 50 | 40 | 10 | 8.09 | 349 | yes |
| formula 8 | 50 | 45 | 5 | 6.4 | 316 | yes |

CHART 3-continued

| | Organic material (% w/w) | Inorganic material (% w/w) | Curing agent (% w/w) | Bending force (N/mm$^2$) | Screw retention force (N) | Flame resistance |
|---|---|---|---|---|---|---|
| formula 9 | 70 | 5 | 25 | 8.7 | 291 | yes |
| formula 10 | 70 | 10 | 20 | 9.14 | 576 | yes |
| formula 11 | 80 | 5 | 15 | 8.28 | 283 | no |
| formula 12 | 80 | 10 | 10 | 8.14 | 330 | no |

Figure 2:
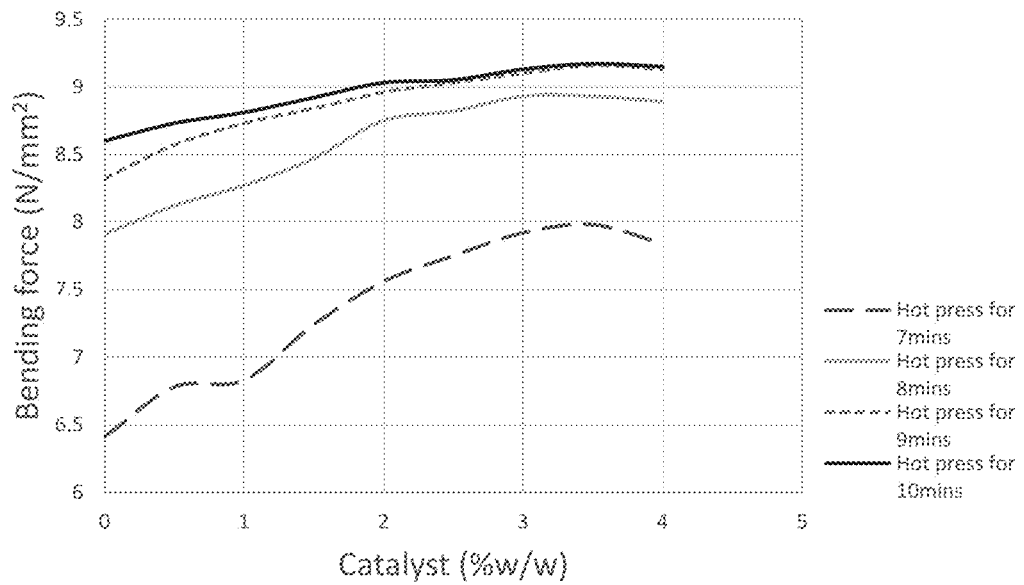
FIG. 2 is a bending strength test result of preferred embodiment of the wood board samples in accordance with the present invention.

With reference to chart 4 and FIG. 2, to achieve a better adhesive ability for the adhesive composition of the present invention, below embodiments try to have a best content ratio for the catalyst in the adhesive composition provided by the present invention. By following the above steps and preferred formula, the wood board samples are first made using the adhesive composition without the catalyst. During the production process, the wood board samples are applied with four different hot-pressing times (7 minutes, 8 minutes, 9 minutes and 10 minutes) to be as control groups. Further as experimental group 1 to experimental group 8 with the catalyst contents started from 0.5% w/w to 4% w/w, the bending strength of the wood board samples are tested with different processing time.

The results show that as the content of the catalyst increased, each of the wood board sample in the experimental groups 1 to 8 can achieve good bending strength compared to all the control groups with 7 minutes of hot-pressing processing time. As the content of the catalyst increased, the bending strength of each wood board sample in the experimental groups 1 to 8 also increased accordingly with different hot-pressing processing times. By introducing the catalyst into the formula, the wood board samples can meet the requirement for bending strength within a shorter time. For example, when the wood board sample is made from the adhesive composition without the catalyst, it needs 10 minutes of hot-pressing to reach the bending strength of 8.6 N/mm$^2$. However, the wood board sample with additional 3% w/w of the catalyst, a similar or even better bending strength can be achieved within just 8 minutes of hot-pressing process. It could be beneficial to the production efficiency in a long term perspective.

However, if the catalyst is overly added, the bending strength of the wood board samples will be otherwise weakened. As shown in FIG. 2, when the catalyst content in experimental group 7 is 3.5% w/w, the bending strength of the wood board sample does not increase significantly compared to that of experimental group 6. In the result of experimental group 8, a reduction of the bending strength is even observed. Hence, excessive doses of the catalyst will cause the adhesive composition to have a loosened structure within the interface of the wood fiber or particles further resulting in poor adhesion. The preferred ratio of the catalyst can be 0% w/w to 3% w/w (less than 3% w/w).

CHART 4

| | Content of the catalyst (%) | Bending strength N/mm$^2$ | | | |
|---|---|---|---|---|---|
| Samples | | Hot-pressing for 7 minutes | Hot-pressing for 8 minutes | Hot-pressing for 9 minutes | Hot-pressing for 10 minutes |
| Control group | 0 | 6.41 | 7.91 | 8.32 | 8.6 |
| Experimental group 1 | 0.5 | 6.78 | 8.12 | 8.57 | 8.73 |
| Experimental group 2 | 1 | 6.83 | 8.27 | 8.73 | 8.81 |
| Experimental group 3 | 1.5 | 7.24 | 8.47 | 8.84 | 8.92 |
| Experimental group 4 | 2 | 7.56 | 8.75 | 8.96 | 9.03 |
| Experimental group 5 | 2.5 | 7.75 | 8.82 | 9.03 | 9.05 |
| Experimental group 6 | 3 | 7.92 | 8.93 | 9.1 | 9.13 |
| Experimental group 7 | 3.5 | 7.98 | 8.93 | 9.16 | 9.17 |
| Experimental group 8 | 4 | 7.84 | 8.89 | 9.13 | 9.15 |

Figure 3:
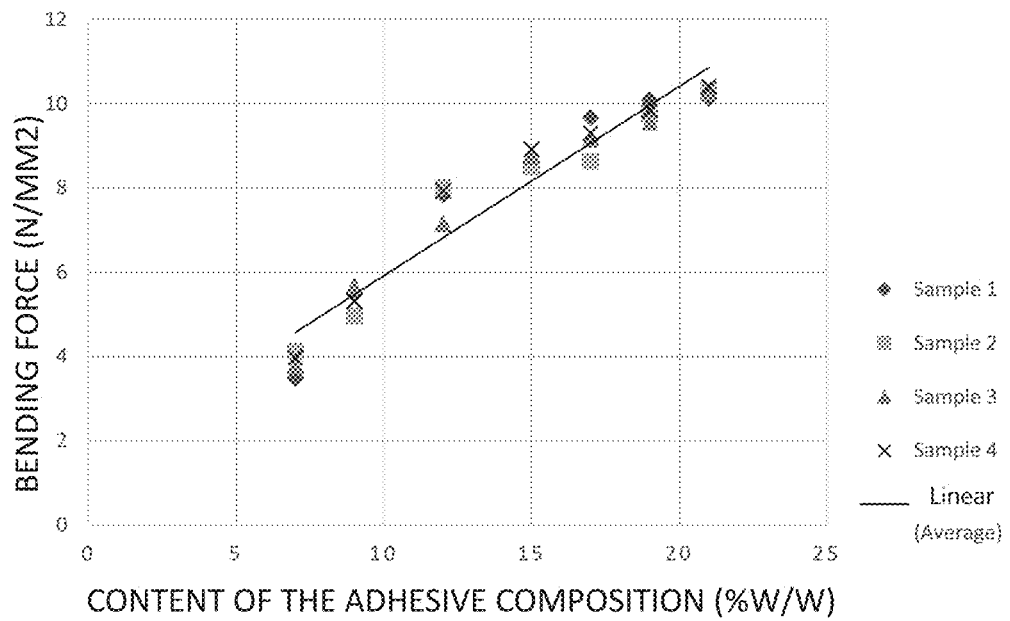
FIG. 3 is another bending strength test result of preferred embodiment of the wood board samples in accordance with the present invention.

With reference to chart 5 and FIG. 3, the present invention uses different contents of the adhesive composition to make the wood board samples, and tests the bending strength according to the CNS2215-2017 standard. The results showed in chart 5 indicates that as the contents of the adhesive composition increased, a better bending strength will be obtained. The quantity of the adhesive composition is directly proportional to the strength of the wood board samples. According to current specifications and requirements, the minimum bending strength of the wood board samples should reach 8 N/mm$^2$. However, with the considerations of production cost, the mixing ratio of the wood raw material and the adhesive composition is in a range of 1:0.15, it can meet the requirements and standardized of production strength and achieve the most reasonable production cost.

CHART 5

| Contents of the adhesive composition (%) | Bending strength N/mm$^2$ | | | |
|---|---|---|---|---|
| | Sample 1 | Sample 2 | Sample 3 | Sample 4 |
| 7 | 3.48 | 4.12 | 3.78 | 3.97 |
| 9 | 5.47 | 4.96 | 5.67 | 5.31 |
| 12 | 7.84 | 8.02 | 7.15 | 7.93 |
| 15 | 8.64 | 8.51 | 8.76 | 8.92 |
| 17 | 9.68 | 8.64 | 9.16 | 9.3 |
| 19 | 10.1 | 9.76 | 9.56 | 9.84 |
| 21 | 10.14 | 10.32 | 10.27 | 10.41 |

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. An adhesive composition in powder form for making a wood board comprising:

an organic material including protein and/or starch in a range of 30%-80% w/w referring to the weight percent based on a total weight of the adhesive composition in powder form;

an inorganic material in a range of 10%-40% w/w referring to the weight percent based on a total weight of the adhesive composition in powder form, the inorganic material comprising a mixture of group IA metal oxides and carbonates or a mixture of group IIA metal oxides, hydroxides and carbonates;

a curing agent contains one or multiple types of boron compounds in a range of 5%-30% w/w referring to the weight percent based on a total weight of the adhesive composition in powder form; and a catalyst contains a group IA metal hydroxide in a range of 0%-3% w/w referring to the weight percent based on a total weight of the adhesive composition in powder form, wherein when the organic material is exposed to moisture and heat, the organic material will possess a fluid nature.

2. The adhesive composition in powder form as claimed in claim 1, wherein the protein in the organic material comprises soybean proteins; and the starch in the organic material comprises modified or natural starch.

3. The adhesive composition in powder form as claimed in claim 2, wherein the natural starch comprises corn starch or tapioca starch; and the modified starch comprises oxidized starch or esterified starch.

4. A production method of a wood board comprises steps of:
crushing a wood raw material and removing impurities to obtain wood raw material particles;
mixing the adhesive composition in powder form as claimed in claim 1 with the wood raw material particles to obtain a wood mixture;
measuring a moisture content of the wood mixture until the moisture content is less than 17% w/w; and
spreading the wood mixture flat on a surface then hot pressed into the wood board.

5. The production method as claimed in claim 4, wherein the wood raw material comprises fresh/virgin wood or recycled wood; and the wood raw material further comprises straw stalk, rice bran, bamboo or palm.

6. The production method as claimed in claim 5, wherein a magnetic separation process is applied in the crushing process steps.

7. The production method as claimed in claim 5, wherein in the measuring step, the moisture content is within a range of 12-15% w/w.

8. The production method as claimed in claim 7, wherein additional water is added to increase the moisture content if the moisture content of the wood mixture is less than 12% w/w.

9. The production method as claimed in claim 4, wherein a magnetic separation process is applied in the crushing process steps.

10. The production method as claimed in claim 4, wherein in the measuring step, the moisture content is within a range of 12-15% w/w.

11. The production method as claimed in claim 10, wherein additional water is added to increase the moisture content if the moisture content of the wood mixture is less than 12% w/w.

12. A wood board comprising:
wood raw material particles, wherein the wood raw material particles come from a recycled flake wood board comprising wood fiber and non-wood material; and the adhesive composition in powder form as claimed in claim 2.

13. The wood board as claimed in claim 12, wherein the non-wood material comprises plastic materials, colorants, surface laminates or functional additives, and the non-wood material in a range of 30% to 60% w/w referring to the weight percent based on a total weight of the wood board.

14. A wood board comprising:
wood raw material particles, wherein the wood raw material particles come from a recycled flake wood board comprising wood fiber and non-wood material; and
the adhesive composition in powder form as claimed in claim 1.

15. The wood board as claimed in claim 14, wherein: the non-wood material comprises plastic materials, colorants, surface laminates or functional additives; and the non-wood material in a range of 30% to 60% w/w referring to the weight percent based on a total weight of the wood board.

* * * * *